(12) United States Patent
Waters et al.

(10) Patent No.: US 10,375,509 B2
(45) Date of Patent: Aug. 6, 2019

(54) SYSTEM AND METHOD FOR POSITIONING

(71) Applicant: Texas Instruments Incorporated, Dallas, TX (US)

(72) Inventors: Deric W. Waters, Dallas, TX (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 926 days.

(21) Appl. No.: 14/060,868

(22) Filed: Oct. 23, 2013

(65) Prior Publication Data
US 2014/0050210 A1 Feb. 20, 2014
US 2019/0200161 A9 Jun. 27, 2019

Related U.S. Application Data

(63) Continuation-in-part of application No. 13/230,512, filed on Sep. 12, 2011, now Pat. No. 8,924,155.

(60) Provisional application No. 61/382,335, filed on Sep. 13, 2010.

(51) Int. Cl.
*H04W 4/02* (2018.01)
*G01S 5/02* (2010.01)
*H04W 64/00* (2009.01)
*G01S 13/82* (2006.01)

(52) U.S. Cl.
CPC ............ *H04W 4/02* (2013.01); *G01S 5/0242* (2013.01); *G01S 13/82* (2013.01); *H04W 64/00* (2013.01)

(58) Field of Classification Search
CPC ....... H04W 4/02; H04W 64/00; G01S 5/0242; G01S 13/82
USPC ........................................................ 370/338
See application file for complete search history.

(56) References Cited

U.S. PATENT DOCUMENTS

| | | | | |
|---|---|---|---|---|
| 2010/0020746 A1* | 1/2010 | Zaks | ...................... | G06Q 30/02 370/328 |
| 2010/0161490 A1* | 6/2010 | Alrabady | ............... | H04W 12/08 705/50 |
| 2010/0178872 A1* | 7/2010 | Alrabady | ................ | H04W 4/02 455/41.3 |
| 2011/0188391 A1* | 8/2011 | Sella | ...................... | H04W 24/10 370/252 |
| 2012/0082144 A1* | 4/2012 | Lee | ........................ | H04W 4/001 370/338 |

* cited by examiner

*Primary Examiner* — Kan Yuen
(74) *Attorney, Agent, or Firm* — Brian D. Graham; Charles A. Brill; Frank D. Cimino

(57) ABSTRACT

Embodiments of the invention include a method for creating probe requests. The method is used when positioning is required. A short probe request is constructed with SSID set to GPS SSID_NAME. Another method continues after a short probe response is received. It is determined if a SSID of the probe response matches the SSID of the short probe request. If it does send an ACK.

18 Claims, 7 Drawing Sheets

SYSTEM AND METHOD FOR POSITIONING

CROSS-REFERENCE TO RELATED APPLICATION

This application is a Continuation-in-Part and claims priority to U.S. patent application Ser. No. 13/230,512, filed on Sep. 12, 2011, entitled SYSTEM AND METHOD FOR ACCESS POINT BASED POSITIONING. This application also claims priority to U.S. Provisional Patent Application No. 61/719,015, filed on Oct. 26, 2012. Both applications are hereby incorporated herein by reference in their entirety.

BACKGROUND

Embodiments of the invention are directed, in general, to positioning systems and, more specifically, wireless probes and Wi-Fi positioning.

As mobile devices proliferate, the demand for services tailored to device location also increases. Location based services depend on positioning systems to determine device location. Satellite based position systems, such as the global positioning system (GPS), GLONASS, and Galileo can provide high accuracy, but require a clear line of sight between the satellites and the mobile device to provide a position determination. Consequently, satellite positioning systems are largely ineffective for indoor positioning. Satellite positioning also requires specialized receivers that may increase the cost of the mobile device.

As an alternative or an augmentation to satellite based positioning, wireless local area network (WLAN) based positioning systems have been developed. WLAN based positioning systems are suitable for indoor positioning and require minimal investment because they make use of existing infrastructure. Furthermore, many mobile wireless devices include support for communication via WLAN.

WLAN based positioning systems determine mobile device position based on the established positions of WLAN access points visible to the device and the strength of signals exchanged between the mobile device and the access points.

Most smartphones use WiFi for positioning. Beacon and/or probe requests and responses may be used to improve positioning of smartphones. However, probe requests and responses sent from smartphones may need improvement in positioning accuracy which results in lower throughput for other devices in the network. This is due to the fact that probe requests and probe responses are sent at low legacy rates and they carry large payloads. What is needed are modified payloads for probe requests and responses without breaking interoperability in the network. The probe requests and responses may still be of the same frame type.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regard less of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In order for a mobile wireless device to establish its location via wireless local area network (WLAN) positioning, the device performs a scanning operation to identify access points (APs) in its vicinity. In practice, one physical unit may act as one or more APs with each AP having a unique MAC address. Scanning for APs to use for positioning has different requirements than a traditional WLAN AP scan that facilitates handover from one AP to another. For example, a traditional AP scan can be terminated as soon as a strong AP responds. In contrast, when scanning for WLAN positioning it may be advantageous and desirable to identify every AP in the vicinity of the mobile wireless device regardless of proximity or signal strength. Embodiments of the present disclosure apply various optimization techniques to reduce mobile device power consumed by AP scanning and to improve scanning efficiency.

Figure 1:
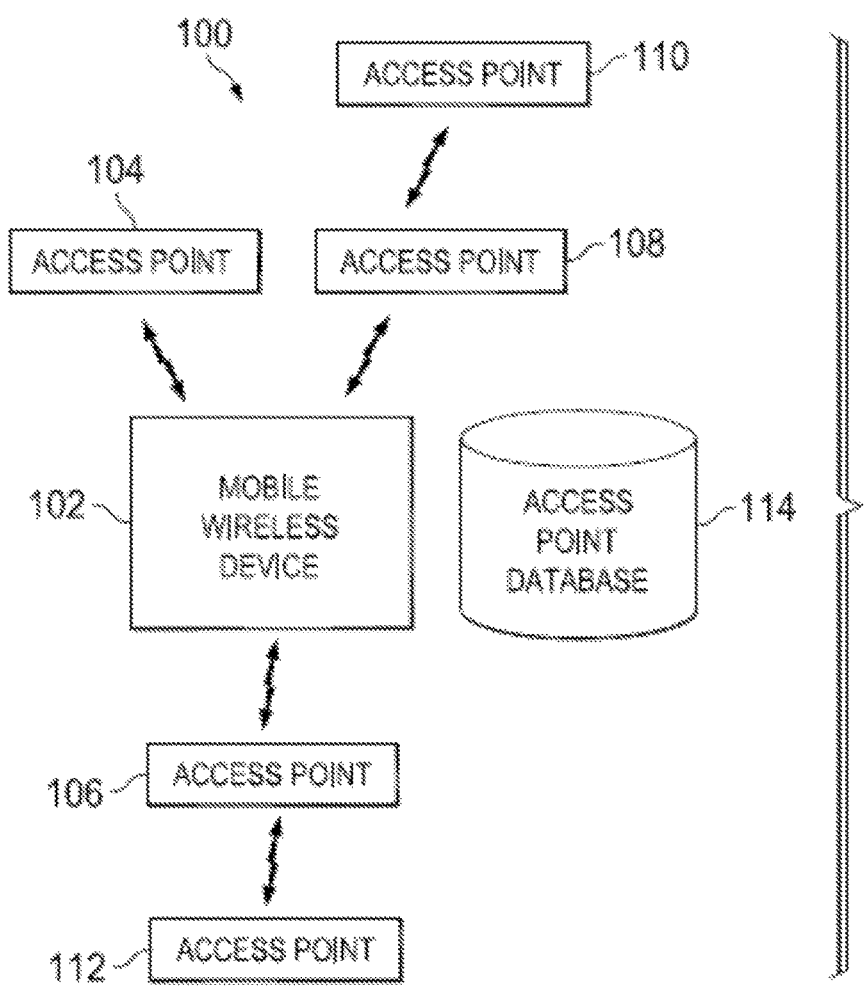
FIG. 1 shows a block diagram of a system for using wireless local area network (WLAN) access points (APs) to determine the position of a wireless device in accordance with various embodiments.

FIG. 1 shows a block diagram of a system 100 for using WLAN access points to determine the position of a wireless device in accordance with various embodiments. The system 100 includes a mobile wireless device 102 and a plurality of WLAN access points 104-112. The mobile wireless device 102 is positioned to wirelessly communicate with one or more of the access points 104-112 each associated with a WLAN (e.g., a network in accordance with one or more the IEEE 802.11 standards). In the embodiment of FIG. 1, the mobile wireless device 102 is positioned to receive transmissions from and/or communicate with any of the access points 104-108. The access points 110, 112 are not directly visible to (e.g., are out of communication range of) the mobile wireless device 102, but may be indirectly visible to the mobile wireless device 102 through access points 106, 108 that are within range of the access points 110, 112. The mobile wireless device 102 may be a cellular telephone, a tablet computer, or any other mobile computing device configured for WLAN access.

The system 100 also includes a database 114 that stores and provides access point location information in response to a positioning information query. In various embodiments, the database 114 is a component of the mobile device 102. In some embodiments of the system 100, the database 114 is accessed though the WLAN. The mobile wireless device 102 executes a scan for APs and provides AP identification and other information (e.g., a medium access controller (MAC) address and/or signal strength measurement) to the database 114. The database 114 may provide AP position information or device 102 position information to the device 102 responsive to the AP identification and associated information provided by the device 102.

The mobile wireless device 102 can actively or passively scan for APs. The MAC address of an AP is carried in the PHY payload, so the wireless device cannot identify an AP based on the preambles of received packets. When executing an active scan, the mobile wireless device 102 transmits a probe request on a selected WLAN channel, waits at least a predetermined interval for a response, and may send an acknowledgement to each AP that responds. Thereafter, the mobile wireless device 102 may select a new network channel and repeat the operations listed above. If the probe request is transmitted using IEEE 802.11b, the range of the probe request is extended allowing reception by more distant APs, but the packet duration is longer than if transmitted using IEEE 802.11a.

Advantages of active scanning include a reduction in scanning time, and corresponding reduction in scanning related power consumption if APs respond quickly to the probe request. Disadvantages of active scanning include the power consumed by probe requests and acknowledgement transmissions, and increased network traffic that may result in collisions and increased latency.

When executing a passive scan, the mobile wireless device 102 listens for beacon frames transmitted by the APs on a selected channel. After listening to the channel for a predetermined interval, the device 102 changes channels and continues listening. Each received beacon frame is processed to extract an AP MAC address, and beacon transmission interval. A typical beacon transmission interval may be about 100 milliseconds (ms).

Advantages of passive scanning include no need for extra transmissions (e.g., probe requests, responses, etc.) by the device 102 or APs, and if the AP downlink range is greater than the device 102 uplink range, then the device 102 may be able to identify APs that are beyond device 102 transmission range. Disadvantages of passive scanning include the need to listen for a maximum beacon interval to identify all APs, and the need to scan channels using multiple modulation modes (e.g., DSSS for 802.11b and OFDM for 802.11a).

Embodiments of the mobile wireless device 102 apply a variety of novel techniques to increase the efficiency of and reduce power consumed by scanning for APs to be used for positioning. The techniques include scanning only channels known to be used by APs, setting channel scan order to increase the probability of identifying APs quickly, and terminating an AP scan based on achieving a predetermined positioning accuracy. Embodiments of the wireless device 102 may implement any combination of the techniques disclosed herein.

Figure 2:
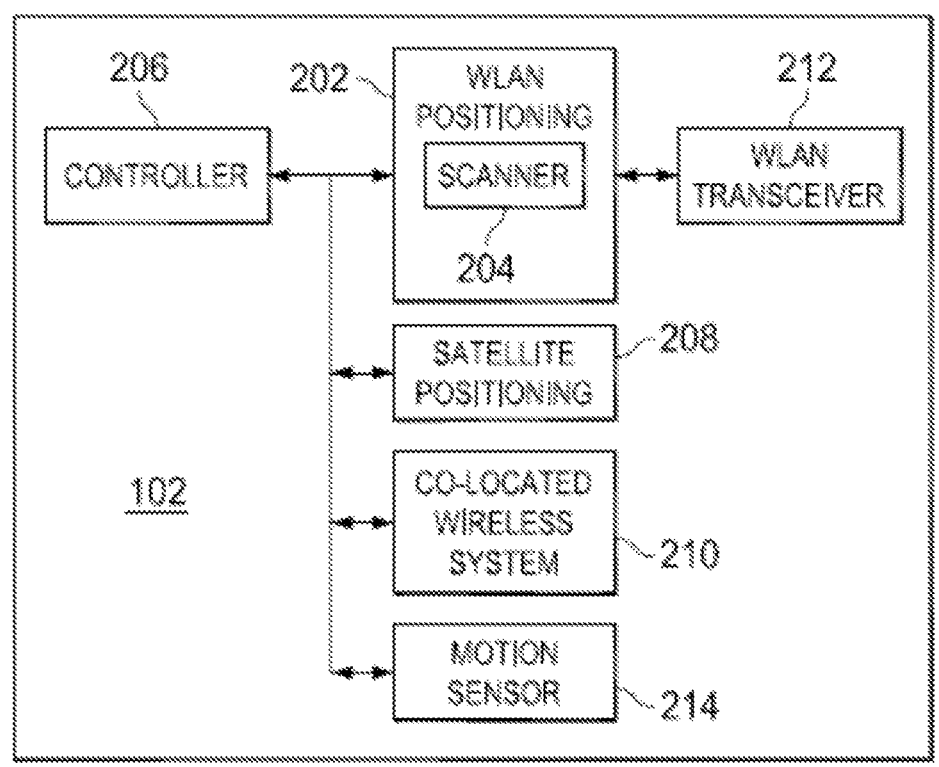
FIG. 2 shows a block diagram of a mobile device configured to perform WLAN positioning by scanning for APs in accordance with various embodiments.

FIG. 2 shows a block diagram of the mobile wireless device 102 configured to perform WLAN positioning by scanning for APs in accordance with various embodiments. The mobile device 102 includes a WLAN transceiver 212, a WLAN positioning system 202, and a controller 206. Embodiments of the mobile wireless device 102 may also include a satellite positioning system 208, a co-located wireless system 210, and/or motion sensor 214.

The WLAN transceiver 212 provides an interface through which the device 102 accesses the wireless medium to communicate with one or more of the access points 104-108. The WLAN positioning system 202 accesses the AP database 114 to provide and/or retrieve AP information, such as AP location information. The AP database 114 may reside in the wireless device or on a network server. The wireless device 102 may also retain a portion of the AP database locally and update the local portion from the server occasionally. The WLAN positioning system 202 includes a scanner 204. The scanner 204 is configured to identify APs proximate to the wireless device 102 for use in WLAN based position determination. The scanner 204 may perform active and/or passive scanning for APs.

The satellite positioning system 208 may include one or more of a global positioning system (GPS) receiver, a Galileo receiver, a GLONASS receiver, or another satellite or wireless positioning system configured to determine the location of the wireless device 102. Embodiments of the scanner 204 may execute AP scans based on a result of satellite position. For example, the scanner 204 may execute an AP scan only if the result of satellite position fails to locate the wireless device 102 with adequate accuracy.

The co-located wireless system 210 may be a BLUETOOTH communication system configured to wirelessly communicate with other BLUETOOTH compliant devices. Because BLUETOOTH networks and IEEE 802.11 WLANs may share at least a portion of the wireless spectrum, the systems 202, 210 may interfere with one another if not properly coordinated. Embodiments of the scanner 204 may execute AP scans in coordination with the wireless medium access schedule of the co-located wireless system 210. For example, the scanner 204 may execute a passive scan based on the co-located wireless system 210 being scheduled to access the wireless medium during an interval when scanning is to be executed.

The controller 206 can coordinate the various activities of the WLAN positioning system 202, the satellite positioning system 208, and the co-located wireless system 210. For example, in some embodiments, the controller 206 may directly control the operation of the WLAN positioning system 202. In some embodiments, the controller 206 may provide a communication channel between the WLAN positioning system 202 and the satellite positioning system 208.

In some embodiments, the satellite positioning system 208 and the WLAN positioning system 202 may communicate directly.

The scanner 204 is configured to implement a variety of scanning techniques that optimize scanning efficiency and power consumption. Some embodiments of the scanner 204 acquire and apply information indicating the WLAN channels most likely to be used by APs proximate to the wireless device 102 to reduce scanning time and power. The scanner 204 may access the AP database 114 to retrieve information regarding what network channels are being used by APs proximate to the wireless device 102, and scan only those channels.

When executing an AP scan, the scanner 204 may schedule channels for scanning in an order that allows the greatest number of APs to be identified in the shortest time. For example, if channel 6, 11 and 1 are the most commonly used (in that order), then the scanner 204 can schedule channel 6 to be scanned first, followed by channels 11 and 1. The scanner 204 may retrieve channel use information from the AP database 114.

The scanner 204 may also determine, prior to initiation of a scan, the identities of APs proximate to the wireless device 102 using a particular channel. Such information may be provided by the AP database 114 or by a previous scan. The scanner 204 can apply the information to determine when all APs on each channel have been identified, allowing the scanner 204 to terminate the scan prior to the expiration of a scheduled scanning interval.

If AP channel information from an AP database is not available, the scanner 204 may scan all channels occasionally, and scan channels on which the device 102 has previously detected APs more frequently, as channels on which APs have been previously detected are likely to be currently used by APs.

Embodiments of the scanner 204 may also apply information regarding the broad geographic area, such as the country, continent, etc., in which the device 102 is operating to limit the channels to be scanned for APs. Regulations promulgated by different states may restrict WLAN use to a subset of the network radio-frequency channels defined by the WLAN standard. For example, WLAN channels 12-13 in the 2.4 gigahertz band are used in most of the world, but are not used in the United States. Consequently, the scanner 204 may avoid scanning of channels 12-13 when located in the United States. Embodiments of the scanner 204 include information identifying channel use by geographic region, and can optimize scanning efficiency by not scanning for APs on channels that are not used by the WLAN in that region.

Prior to executing an AP scan, the scanner 204 may execute a pre-scan to determine which WLAN channels are active in the vicinity of the wireless device 102. The pre-scan is useful when the scanner 204 lacks other information, such as information from an AP database, regarding active WLAN channels. WLAN channels have a signal bandwidth of 20 megahertz (MHz), but are separated by only 5 MHz. The pre-scan detects and analyzes the radio frequency energy in non-overlapping WLAN channels to determine which channels should be scanned for APs. If energy is detected, then the scanner 204 can determine which channel the transmission is on (see, U.S. Pat. No. 7,583,764, "Interference-tolerant Packet Detection for WLAN," describing a process that enables detection of the Adjacent Channel Signal, determination of whether an adjacent channel contains valid WLAN signal, and the particular channel containing the valid WLAN signal (+/−5 MHz, +/−10 MHz, etc)). If a signal is detected, but the originating channel cannot be determined (such as in 802.11b) then the scanner 204 can either initiate a scan on the channel or first complete all pre-scans then choose which channel(s) to scan knowing that there is a signal on the current channel or an adjacent channel. The scanner 204 sets the channels to be pre-scanned and the pre-scanning order to optimize pre-scanning efficiency. For example, channels 2, 4, 6, 8, 10, 12, and 14 may be scheduled for pre-scanning in an order that pre-scans the channels most likely to be used first.

Embodiments of the scanner 204 may reduce scanning power consumption by discontinuing an AP scan based on identifying a sufficient number of APs to achieve a predetermined positioning accuracy. For example, if the scanner 204 identifies a large number (e.g., 20-30) of APs on a single channel or within a portion of the scheduled scanning interval, then scanning of additional channels or for additional time is unnecessary because the wireless device 102 can be accurately positioned based on the identified APs. When considering the number of APs identified, the scanner 204 may include only APs having a known position. The desired positioning accuracy may determine the number of APs required for positioning. For example, if only 200 meter accuracy is required, then the scanner 204 can terminate scanning after two APs having known locations have been identified.

The wireless device 102 may also include a motion sensor 214, such as an accelerometer, gyroscope, etc. The scanner 204 is coupled to the motion sensor 214 and may initiate an AP scan based on an output of the motion sensor 214 indicating that the wireless device 102 has moved significantly since a previous AP scan was executed. If the motion sensor 214 indicates that the wireless device has not moved, then if the scanner 204 executes an AP scan, the scan can be constrained based on an assumption that only previously identified APs are visible. For example, assuming that all visible AP have been identified, the scanner 204 may scan only channels used by APs during the previous scan, and can terminate the scan when all previously identified APs have detected (e.g., beacons from all previously identified APs have been received). In some embodiments, the scanner 204 issues probe requests to previously identified APs or listens for beacon transmission at times determined from previously received beacon frames.

Similarly, the scanner 204 may be configured to execute an AP scan based on the accuracy of satellite or other positioning. If the satellite positioning system 208 provides sufficiently accurate positioning, then the scanner 204 may not scan for APs. For example, if the position of the wireless device 102 is determined by the satellite positioning system 208 based on four or more positioning satellites, or with a location uncertainty below a predetermined threshold (e.g., 10 meters), then the scanner 204 may not scan for APs.

When initiating an AP scan, the scanner 204 sets a time interval over which the scan is to be performed. For example, the scanner 204 may set a time interval over which a given WLAN channel is to be actively and/or passively scanned for APs. While listening for probe responses to a probe request as part of an active scan, the wireless device 102 may also receive beacon transmissions. The beacon transmissions provide extra Rssi measurements which the scanner 204 can process. If multiple measurements are made for an individual AP, then each measurement is useful for the processing and may be passed to the WLAN Positioning block 202. During the time interval, the scanner 204 can make adjustments to the interval, based on the number of AP identified. For example, if a sufficient number of APs have been identified before the interval expires, then the interval can be prematurely terminated to reduce scan and/or transceiver 212 power consumption. If an insufficient number of APs have been identified, then the interval can be extended prior to its expiration. Some embodiments of the scanner 204 set the time interval to a relatively small value (e.g., 5 ms) and determine during the interval whether the interval should be extended (e.g., by another 5 ms).

Embodiments of the scanner 204 use beacon frames to improve scanning efficiency. Beacon frames allow the scanner 204 to request from a first AP a list of APs visible to the first AP including the WLAN channels used by the visible APs. If a database 114 is not available to indicate channel usage in the vicinity of the wireless device 102, then the scanner 204 may use the beacon reports, in place of the data base 114, to generate AP channel information.

Beacon frames also include beacon interval information that the scanner 204 uses to predict arrival times of future beacon frames. Once the scanner 204 has received a beacon frame from an AP, the scanner 204 can predict when that AP will transmit future beacon frames, and predict the best time interval to listen for that AP. To determine a time interval for passive scanning, the scanner 204 first identifies a sub-set of the APs identified in the vicinity of the wireless device 102, and then determines a time interval over which to scan for the sub-set of APs.

The scanner 204 may select the sub-set of APs for which to scan based on various criteria. Some embodiments of the scanner 204 apply an AP geometry metric to select the sub-set of APs. If there are a total of M APs in the vicinity of the wireless device 102 (M≥N), with $N_C$ APs on a given channel, then some embodiments select the $M_C$ APs on a given channel that have the best metric regarding the AP geometry ($M_C$>$N_C$), and select a time interval for scanning in which the beacons from the selected APs are predicted to be closest together. Other embodiments, set a scanning window time interval (e.g., T ms), slide the window and compute a metric regarding the AP geometry of those APs whose beacons are expected to arrive during the window, and schedule scanning to occur during the window that provides the best metric. If the metric is sufficient (larger or smaller than a threshold depending on metric definition) then the scan may be limited to one channel. If the metric is too small or too large, then scanner may increase the listening window time or scan multiple channels.

The scanner 204 may compute various geometry metrics for use in selecting the APs for which to scan. Some embodiments of the scanner 204 apply a dilution of precision (DOP) computation to determine a geometry metric. The DOP computation may be similar to DOP computed for GPS where the APs serve as the satellites and there is no clock bias. DOP is defined as:

$$DOP = \text{trace}(\text{inv}(H^*H)),$$

where, H is a matrix whose rows are the line-of-sight unit vectors from the predicted position of the wireless device 102 to a particular AP. A smaller DOP signifies a better AP geometry. The scanner 204 may compute the geometry metric only in the horizontal plane.

Some embodiments of the scanner 204 generate a geometry metric based on the area of a geometric contour of the APs, where a large area indicates a good AP geometry. The scanner 204 may produce the geometric contour by drawing a straight line between individual AP locations in such a way that all AP locations are either touched only once (except the starting/ending point) or are surrounded by the line, and the line does not intersect itself.

Embodiments of the scanner 204 may also generate a geometry metric based on the mutual distance between APs. For a set of APs with positions $p_1, p_2, \ldots p_M$ the scanner 204 may generate the metric as:

$$J = \sum_{j=1}^{M} \max_{i \neq j} \|p_i - p_j\|, \text{ or}$$

$$J = \sum_{j=1}^{M} \sum_{i \neq j} \|p_i - p_j\|,$$

where a good AP geometry has a large value of J.

The scanner 204 may also generate a geometry metric based on the angles of arrival from the APs to the predicted position of the wireless device 102. The predicted position may be derived from previous position estimates or taken as the average of the locations of the visible APs. The scanner 204 may compute the metric by dividing the 360 degree space into discrete sections and counting the number of APs whose angle-of-arrival falls in each section. In this case, uniform coverage means that the standard deviation between the numbers of APs in each section is low. The metric is the standard deviation of the numbers of APs in each section, so having a low metric in this case indicates a good AP geometry. Some embodiments may rotate the sections by half their width and recompute the metric, in which case the larger of the two metrics is selected as the final metric.

As explained above, the scanner 204 can execute either of an active AP scan and a passive AP scan. Embodiments of the scanner 204 may select active or passive scanning based on various factors including: information retrieved from the AP database 114, measured WLAN load, and activity of the co-located wireless system 210. The scanner 204 may retrieve information indicating whether active or passive scanning is more efficient from the AP database 114. Such information may include the number of mobile wireless devices proximate to the wireless device 102, the number of wireless devices proximate to the wireless device 102 that are requesting AP location information from the database 114, and/or a flag value indicating whether active or passive scanning is preferred by the database 114.

The scanner 204 may also measure the amount of traffic on the WLAN and determine whether active or passive scanning may be more efficient based on the network traffic load. If network is loaded down with traffic, then passive scanning may be preferred. Similarly, if the scanner 204 determines that the co-located wireless system 210 is scheduled to access the wireless medium, then passive scanning may be preferred to avert interference between co-existing networks.

When the wireless device 102 is associated to a basic service set (BSS), the device 102 will adhere to certain requirements to maintain the association. For example, the device 102 will receive synchronization beacon frames sent by the AP to which it is associated. The wireless device 102 may download or upload data via the WLAN while computing its position. Embodiments of the scanner 204 are configured to execute AP scans with minimum impact on other WLAN communications. If the wireless device 102 is expecting to receive packets on channel 1, then the scanner 204 cannot scan other channels while those packets arrive. Packets may be, for example, beacon frames that the wireless device 102 must process, or packets carrying data for the wireless device 102 to download. The scanner 402 is configured to avoid scanning channels near the transmission channel while transmission is active.

The scanner 204 applies the various scanning techniques disclosed herein while the device 102 is associated to a BSS as long as the device 102 is able to continue to complete its other WLAN tasks. The scanner 204 also applies specific techniques that facilitate scanning while the wireless device 102 is associated to an AP. The wireless device 102 may be simultaneously associated with multiple APs. The techniques described herein can be applied to all associated APs. Some embodiments of the scanner 204 scan those channel(s) to which the wireless device 102 is currently associated to obtain positioning information. Such scanning may only require enabling the WLAN transceiver 212 to listen for a short time longer than it would have been enabled in non-scanning operation. If two associated APs are on different channels, the amount of time spent on each channel may need to be increased.

Some embodiments of the scanner 204 avoid interfering with a download in progress by applying a power-save mode, such as that supported by the IEEE 802.11 standard. In the power-save mode, packet transfers are scheduled ahead of time to allow the wireless device 102 to conserve power by activating the transceiver 212 only at times scheduled for packet transfer. In such embodiments, the scanner 204 is aware of the packet transfer schedule, and schedules scanning for WLAN-based positioning only at times when other WLAN transfers are not scheduled. If the wireless device 102 is scheduled to receive a packet via the WLAN, the scanner 204 can scan the same channel (for positioning) before or after the scheduled packet arrival time.

The scanner 204 may also execute an AP scan without disrupting WLAN data flow by causing the transceiver 212 to delay its transmission of TCP ACK messages. The delay will temporarily stall AP transmission of other packets, allowing time for scanning during the delay interval.

Various components of the wireless device 102 including at least some portions of the WLAN positioning block 202 and the controller 206 can be implemented using a processor executing software programming that causes the processor to perform the operations described herein. In some embodiments, the scanner 204 includes a processor executing software programming that causes the processor to scan a WLAN for APs to use for positioning the wireless device 102. The scanning may apply one or more of the techniques disclosed herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory, or combinations thereof.

Some embodiments can implement portions of the wireless device 102, including portions of the WLAN positioning block 202 using dedicated circuitry (e.g., dedicated circuitry implemented in an integrated circuit). Some embodiments may use a combination of dedicated circuitry and a processor executing suitable software. For example, some portions of the WLAN positioning block 202 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 3:
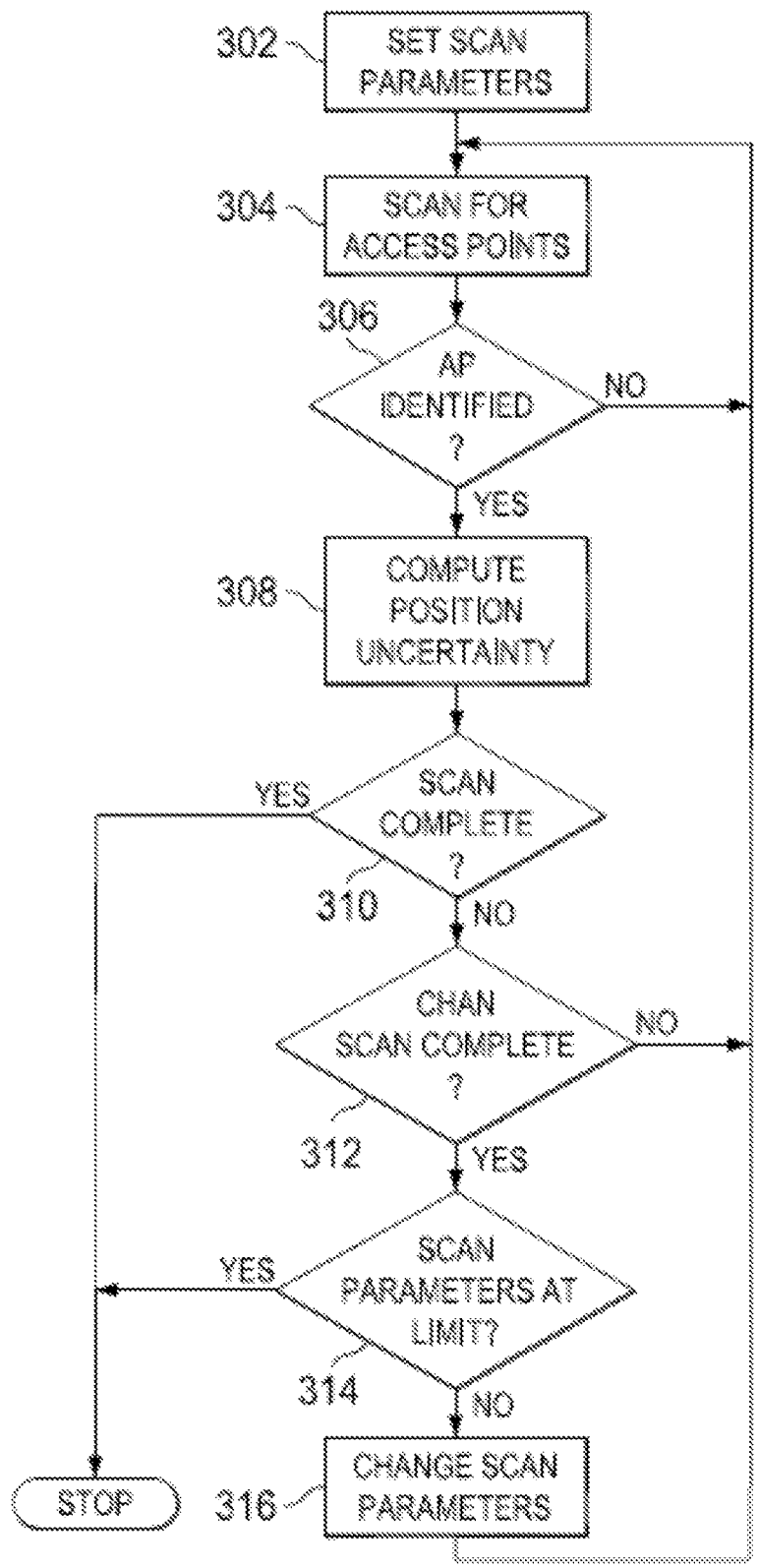
FIG. 3 shows a flow diagram for a method for scanning for APs to determine the position of a mobile wireless device.

FIG. 3 shows a flow diagram for a method 300 for scanning for APs to determine the position of the mobile wireless device 102 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300, as well as other operations described herein, can be performed by the scanner 204 and implemented by a processor executing instructions stored in a computer readable medium.

In block 302, the scanner 204 is preparing to scan the WLAN for APs. APs identified by the scan are used to determine the position of the wireless device 102. The scanner 204 initializes the parameters to be used to execute the scan. The various parameters initialized include scanning time interval, scan type (active or passive), network channel to scan, and modulation mode. In one embodiment, the time interval may be 25 ms, the scan type may be active, the channel may be one, and the modulation mode may be OFDM premium. Multiple OFDM modes may be available that offer different levels of performance. OFDM premium refers to the best performing available mode. Other embodiments may use different parameter initialization values.

In block 304, the scanner 204 scans the WLAN for AP transmissions in accordance with the current parameter settings. Scanning continues until an AP is identified or the scanning time interval expires.

If an AP is identified, in block 306, then the scanner 204 computes a position uncertainty for the wireless device 102 based on the identified AP and previously identified APs. If the computed position uncertainty is less than a predetermined position uncertainty threshold, or all APs proximate to the wireless device 102 have been identified, then the scan is deemed complete in block 310.

If the scan is deemed incomplete, then in block 312 the scanner 204 determines whether the scan of the current channel is complete. The scan of the current channel is complete if all or a predetermined percentage of the APs on the channel have been identified. If not complete, then scanning of the channel continues in block 304.

If scanning of the current channel is complete, then the scanner 204 determines whether the scan parameters are at their limits. For example, the scanner 204 may determine whether all the channels to be scanned have been scanned, and whether the scanning time interval is set to a predetermined maximum value.

If scanning parameters are not maximized, then the scanner 204 changes the scan parameters in block 316 and scanning continues. For example, the scanner 204 may change one or more of the scanning time interval, scan type, network channel to scan, and modulation mode.

Figure 4:
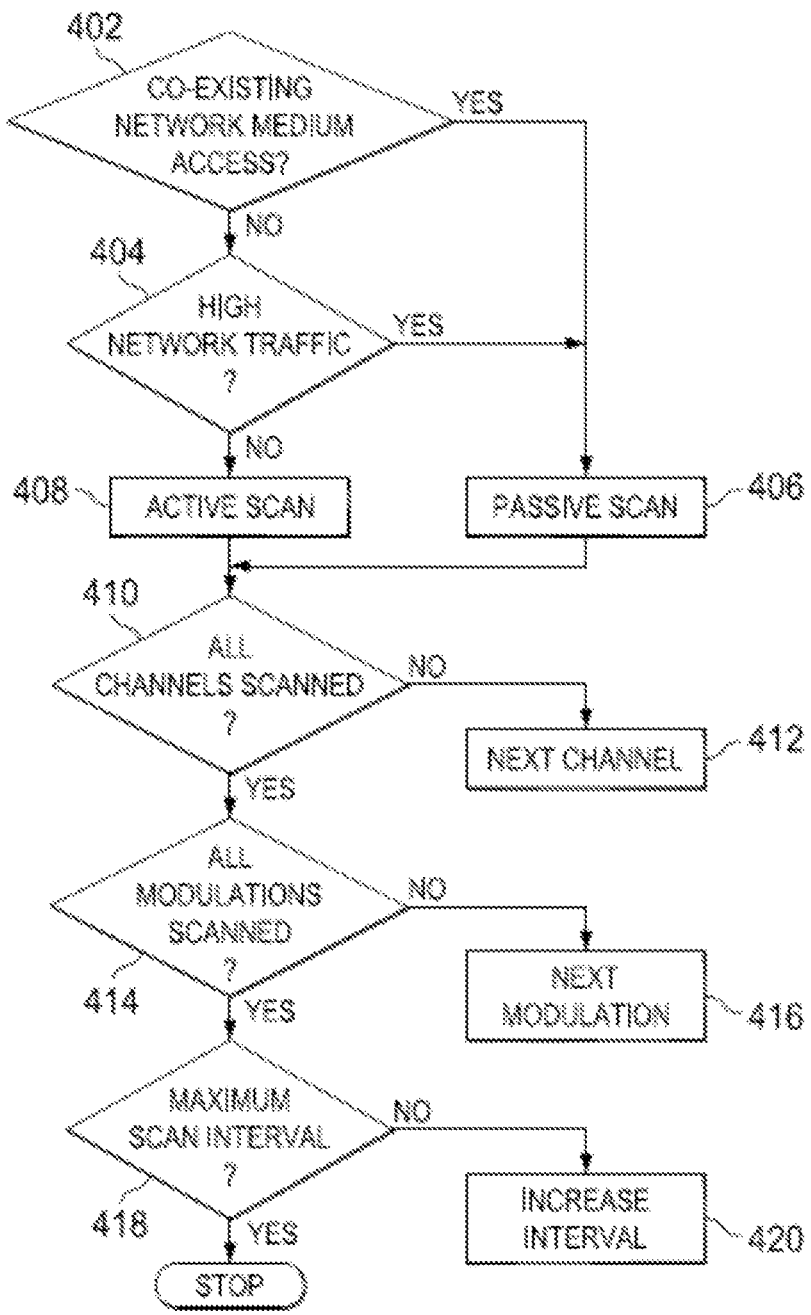
FIG. 4 shows a flow diagram for a method for adjusting parameters applied to an AP scan.

FIG. 4 shows a flow diagram for a method 400 for adjusting scanning parameters for an AP scan in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be performed by the scanner 204 and implemented by a processor executing instructions stored in a computer readable medium. The operations of method 400 may be incorporated in block 316 of method 300.

In block 402, the scanner 204 determines whether a co-existing wireless network (e.g., the co-located wireless system 210) is scheduled to access the wireless medium. If so, then the scanner 204 selects passive scanning in block 406. Otherwise, the scanner 204 measures the level of traffic on the WLAN in block 404. If the level of traffic is high, then the scanner 204 selects passive scanning in block 406. If the scanner 204 fails to detect a co-existing wireless network scheduled to access the wireless medium or a high level of network traffic, then the scanner 204 selects active scanning in block 408.

In block 410, the scanner 204 determines whether all channels to be scanned have been scanned. For example, the scanner 204 may be configured to scan channels 1, 11, and 6, and/or any other channels specified by the database 114 or known to the scanner 204 as used by an AP proximate to the wireless device 102. If not all channels have been scanned, then the next channel is selected for scanning in block 412, and scanning continues.

In block 414, the scanner 204 determines whether all modulations have been applied while scanning. For example, the scanner 204 may be configured to apply OFDM premium and 11CCK modulations while scanning. If not all modulations have been applied, then the next modulation mode is selected for scanning in block 416 and scanning continues.

In block 418, the scanner 204 determines whether the scanning time interval is set to a predetermined maximum value (e.g. 100 ms). If the time interval is less than the maximum value, then the time interval is increased or extended in block 420 and scanning continues. Some embodiments may increase the time interval in 25 ms increments. Other embodiments may apply a different increment value and/or maximum value.

Figure 5:
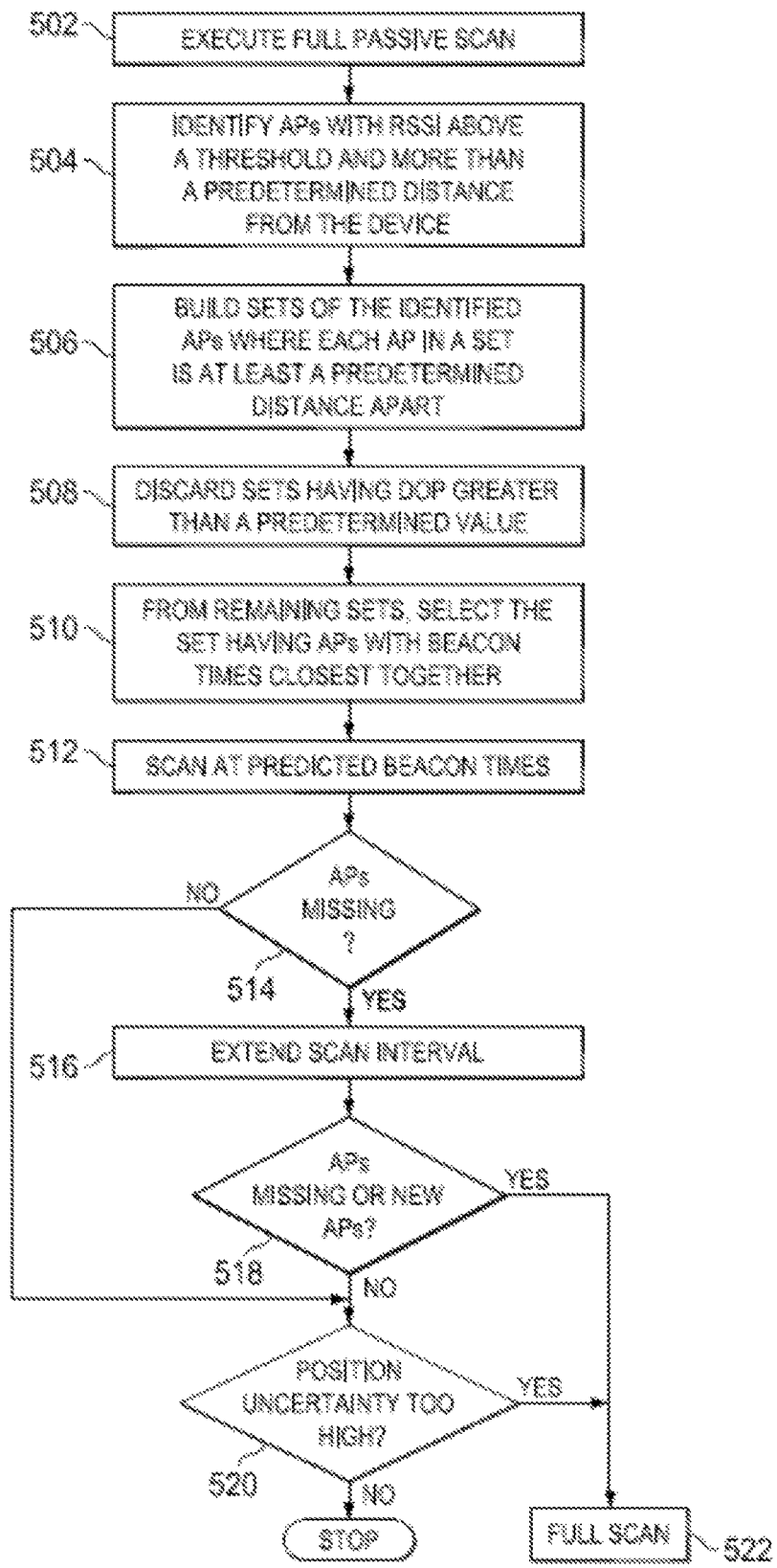
FIG. 5 shows a flow diagram for another method for scanning for APs to determine the position of a mobile wireless device.

FIG. 5 shows a flow diagram for a method 500 for scanning for APs to determine the position of the mobile wireless device 102 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be performed by the scanner 204 and implemented by a processor executing instructions stored in a computer readable medium.

In block 502, the scanner 204 executes a full passive scan. The passive scan identifies all or substantially all of the APs in the vicinity of the wireless device 102. Based on the beacon frames received in the passive scan, the scanner 204 predicts the future transmission times of subsequent beacon frames and schedules scanning, based on the predicted beacon times, to reduce scanning power consumption. Based on the predicted beacon timings, the scanner 204 schedules a scan that is just long enough to determine whether the wireless device 102 has moved significantly since the last scan.

In block 504, the scanner 204 identifies, from the set of all previously identified APs, all APs having a received signal strength indicator (Rssi) value greater that a predetermined minimum Rssi threshold value and located more than a predetermined distance from the wireless device 102. APs with weak Rssi may be only intermittently visible, and movement may not be detectable based on APs that are too close to the wireless device 102 because such APs may still be detected even if the device 102 has moved significantly.

In block 506, the scanner 204 builds all possible sets of APs from those APs identified in block 504. Each set may include more than one AP (e.g., three APs). Each AP in a set must be at least a predetermined distance from each other AP in the set. In some embodiments, the APs of each set use the same network channel. The scanner 204, computes a DOP value for each set, and discards sets having a DOP value greater than a predetermined threshold in block 508.

From the remaining sets, the scanner 204 selects, in block 510, a set of APs for which to scan. The selected set may be the set having APs that are predicted to transmit beacon frames the closest together in time. Alternatively, the selected set may be the set having the APs considered to provide the best positioning. The scanner 204 scans the WLAN for the APs at the predicted beacon times in block 512. Alternatively, some embodiments may issue probe requests to the AP of the selected set. In block 514, if one or more AP of the set is not detected during the scanning, then in block 516, the scanner 204 extends the scanning interval and scanning continues.

In block 518, the scanner 204 determines whether one or more AP of the set is missing or a new AP not included in the set and having Rssi greater that the predetermined minimum Rssi threshold was detected. If an AP of the set was not detected or a new AP was detected, then a full scan is performed in block 522.

In block 520, the scanner 204 computes a position uncertainty value for the wireless device 102 based on the APs of the set and the associated Rssi values. If the position uncertainly value is too high, then the scanner 204 executes a full scan in block 522.

When implementing an active scan, the scanner 204 may use positioning probe requests and the responding AP (any of 104-106) may use shorter positioning probe responses. The positioning probe requests are shorter than the typical probe requests used for normal WLAN communications. Likewise, the positioning probe responses are shorter than the typical probe responses used for normal WLAN communications. Hence, the amount of time that these frames will occupy over the air is reduced; and thus reducing the overhead in the network. First, let us describe how legacy probe requests and probe responses look like.

Some tables below show the format of a normal probe request frame body from IEEE Stds. 802.11-2012, *Part 11: Wireless LAN Medium Access Control (MAC) and Physical Layer (PHY) Specifications*, IEEE 2012. They are numbered as 8-xx.

The length of the probe request frame body may be in tens-of bytes. Therefore, transmission of tens-of bytes at for example, 1 Mbps data rate, will result in the packet occupying a time interval of a few msec. However, for smartphones that require probe responses for positioning only, the probe request may be shortened. Furthermore, regardless of the 802.11 setting on the phone, if the purpose is positioning only, then only SSID and supported rates may be included. To distinguish this probe from other regular probes, a SSID of the smartphone may be "GPS SSID_NAME" as an example. The first three characters, GPS, will indicate to the AP that the probe requests are solely for positioning purposes. While SSID_NAME may be the SSID name that the smartphone is using, the supported rates field may also be reduced from 8 bytes (which is the maximum) to one byte. Note that AP can record the rate at which the probe request were received and send the response at the same rate. In this case, supported rates may be omitted as well.

TABLE 8.26

Probe Request frame body

| Order | Information | Notes |
|---|---|---|
| 1 | SSID | If dot11MeshActivated is true, the SSID element is the wildcard value as described in 8.4.2.2. |
| 2 | Supported rates | |
| 3 | Request information | The Request element is optionally present if dot11MultiDomainCapabilityActivated is true. |
| 4 | Extended Supported Rates | The Extended Supported Rates element is present if there are more than eight supported rates, and is optionally present otherwise. |
| 5 | DSSS Parameter Sex | The DSSS Parameter Set element is present within Probe Request frames generated by STAs using Clause 16, Clause 17, or Clause 19 PHYs if dot11RadioMeasurementActivated is true. The DSSS Parameter Set element is present within Probe Request frames generated by STAs using a Clause 20 PHY in the 2.4 GHz band if dot11RadioMeasurementActivated is true. The DSSS Parameter Set element is optionally present within Probe Request frames generated by STAs using Clause 16, Clause 17, or Clause 19 PHYs if dot11RadioMeasurement Activated is false. The DSSS Parameter Set element is optionally present within Probe Request frames generated by STAs using a Clause 20 PHY in the 2.4 GHz band if dot11RadioMeasurementActivatedm is false. |
| 6 | Supported Operating Classes | The Supported Operating Classes element is present if dot11ExtendedChannelSwitchActivated is true. |
| 7 | HT Capabilities | The HT Capabilities element is present when dot11HighThroughputOptionImplemented attribute is true. |
| 8 | 20/40 BSS Coexistence | The 20/40 BSS Coexistence element is optionally present when the dot112040BSSCoexistenceManagementSupport attribute is true. |
| 9 | Extended Capabilities | The Extended Capabilities element is optionally present if any of the fields in this element are nonzero. |
| 10 | SSID List | The SSID List element is optionally present if dot11MgmtOptionSSIDListActivated is true. |
| 11 | Channel Usage | The Channel Usage element is optionally present if dot11MgmtOptionChannelUsageActivated is true. |
| 12 | Interworking | The Interowrking element is present if dot11InterworkingServiceActivated is true. |
| 13 | Mesh ID | The Mesh ID element is present if dot11MeshActivated is true. |
| Last | Vendor Specific | One or more vendor-specific elements ate optionally present. These elements follow all other elements. |

Thus, the proposed probe request will have the following format as depicted in Table 2.

TABLE 2

Proposed probe request frame.

| Order | Information | Note |
|---|---|---|
| 1 | SSID | GPS SSID Name |
| 2 | Supported Rates | 0-1 byte field |

Table 8-27 shows a normal probe response as defined in IEEE Stds. 802.11-2012, *Part 11: Wireless LAN Medium Access Control (MAC) and Physical Layer (PHY) Specifications*, IEEE 2012. The smartphone requesting a probe response for positioning will receive more information than is necessary. There are more than 50 information elements that may be included in the probe response, which are not required for positioning. Thus, embodiments of the invention shorten the information elements that a probe response contains when it is sent in response to probe request from a station that is interested in position only.

TABLE 8-27

Probe Response frame body

| Order | Information | Notes |
|---|---|---|
| 1 | Timestamp | |
| 2 | Beacon interval | |
| 3 | Capability | |
| 4 | SSID | If dot11MeshActivated is true, the SSID element is the wildcard value as described in 8.4.2.2. |
| 5 | Supported rates | |
| 6 | FH Parameter Set | The FH Parameter Set element is present within Probe Response frames generated by STAs using FH PHYs. |

TABLE 8-27-continued

Probe Response frame body

| Order | Information | Notes |
|---|---|---|
| 7 | DSSS Parameter Set | The DSSS Parameter Set element is present within Probe Response frames generated by STAs using Clause 16, Clause 17, and Clause 19 PHYs. The DSSS Patameter Set element is present within Probe Response frames generated by STAs using a Clause 20 PHY in the 2.4 GHz band |
| 8 | CF Parameter Set | The CF Parameter Set element is present only within Probe Response frames generated by APs supporting a PCF. |
| 9 | IBSS Parameter Set | The IBSS Parameter Set element is present only within Probe Response frames generated by STAs in an IBSS. |
| 10 | Country | The Country element is present if dot11MultiDomainCapabilityActivated is time or dot11SpectrumManagementRequired is true or dot11RadioMeasurementActivated is true. |
| 11 | FH Parameters | The FH Parameters element as specified in 8.4.2.11. is optionally present if dot11MultiDomainCapabilityActivated is true. |
| 12 | FH Pattern Table | The FH Pattern Table element as specified in 8.4.2.12, is optionally present if dot11MultiDomainCapabilityActivated is true. |
| 13 | Power Constraint | The Power Constraint element is present if dot11SpectrumManagementRequired is true and is optionally present if dot11RadioMeasurementActivated is true. |
| 14 | Channel Switch Announcement | The Channel Switch Announcement element is optionally present if dot11SpectrumManagementRequired is true. |
| 15 | Quiet | The Quiet element is optionally present if dot11SpectrumManagementRequired is true or if dot11RadioMeasurementActivated is true. |
| 16 | IBSS DPS | The IBSS DPS element is present if dot11SpectrumManagementRequired is true in an IBSS |
| 17 | TPC Report | The TPC Report element is present if dot11SpectrumManagementRequired is true or dot11RadioMeasurementActivated is true. |
| 18 | ERP | The ERP element is present within Probe Response frames generated by STAs using ERPs and is optionally present otherwise. |
| 19 | Extended Supported Rates | The Extended Supported Rates element is present if there are more than eight supported rates, and it is optionally present otherwise. |
| 20 | RSN | The RSNE is present only if dot11RSNAActivated is true. |
| 21 | BSS Load | The BSS Load element is present if dot11QosOption-Implemented and dot11QBSSLoadingelemented are both true. |
| 22 | EDCA Parameter Set | The EDCA Parameter Set element is present if dot11QosOptionImplemented is true and dot11MeshActivated is false. |
| 23 | Measurement Pilot Transmission | The Measurement Pilot Transmission element is present if dot11RMMeasurementPilotActivated is between 2 and 2. |
| 24 | Multiple BSSID | One or more Multiple BSSID elements are present if dot11RMMeasurementPilotActivated is between 2 and 2 and the AP is a member of a Multiple BSSID Set (see 10.11.14) with two or more members, or if dot11MgmtOptionMultiBSSIDActivated is true, or if dot11InterworkingServiceActivated is true and the AP is a member of Multiple BSSID Set with two or more members and at least one dot11GASAdvertisementID MIB attribute exists. |
| 25 | RM Enabled Capabilities | The RM Enabled Capabilities element is present if dot11RadioMeasurementActivated is true. |
| 26 | AP Channel Report | If do11RMAPChannelReportActivated is true, one AP channel Report element is optionally present for each operating class that has at least 1 channel to report. |
| 27 | BSS Average Access Delay | The BSS Average Access Delay element is optionally present if dot11RMBSSAverageAccessDelayActivated is true and the value of the AP Average Access Delay field is not equal to 255 (measurement not available). |
| 28 | Antenna | The Antenna element is optionally present if dot11RMAntennaInformationActivated is true and the value of the Antenna ID field is not equal to 0 (unknown antenna). |
| 29 | BSS Available Admission Capacity | The BSS Available Admission Capacity element is optionally present if dot11RMBSSAvailableAdmissionCapacityActivated is true with the following exceptions: 1) when Available Admission Capacity Bitmask equals 0 (Available Admission Capacity List contains no entries), or 2) when the BSS Load element is present and the Available Capacity Bitmask equals 256 (Available Admission Capacity List contains only the AC_VO entry). |
| 30 | BSS AC Access Delay | The BSS AC Access Delay element is optionally present if dot11RMBSSAverageAccessDelayActivated is true and at least one field of the element is not equal to 255 (measurement not available). |
| 31 | Mobility Domain | The MDE is present if dot11FastBSSTransitionActivated is true. |
| 32 | DSE registered location | The DSE Registered Location element is present if dot11LCIDSERequired is true. |

TABLE 8-27-continued

Probe Response frame body

| Order | Information | Notes |
|---|---|---|
| 33 | Extended Channel Switch Announcement | The Extended Channel Switch Announcement element is optionally present if dot11ExtendedChannelSwitchActivated is true. |
| 34 | Suported Operating Classes | The Supported Operating Classes element is present if dot11ExtendedChannelSwitchActivated is true. |
| 35 | HT Capabilities | The HT Capabilities element is present when dot11HighThroughputOptionImplemented attribute is true. |
| 36 | HT Operation | The HT Operation element is included by an AP and a mesh STA when dot11HighThroughputOptionImplemented attribute is true. |
| 37 | 20/40 BSS Coexistence | The 20/40 BSS Coexistence element is optionally present when the dot112040BSSCoexistenceManagementSupport attribute is true. |
| 38 | Overlapping BSS Scan Paramaters | The Overlapping BSS Scan Parameters element is optionally present if the dot11FortyMHzOptionImplemented attribute is true. |
| 39 | Extended Capabilities | The Extended Capabilities element is optionally if any of the field in the element are nonzero. |
| 40 | QoS Traffic Capability | The QoS Traffic Capability element is optionally present if dot11MgmtOptionACStationCountActivated is true. |
| 41 | Channel Usage | The Channel Usage element is present if the Channel Usage element is present in the Probe Request frame and dot11MgmtOptionChannelUsageActivated is true. |
| 42 | Tissue Advertisement | The Time Advertisement element is present if dot11MgmtOptionUTCTSFOffsetActivated is true. |
| 43 | Time Zone | The Time Zone element is present if dot11MgmtOptionUTCTSFOffsetActivated is true. |
| 44 | Interworking | The Interworking element is present if dot11InterworkingServiceActivated is true. |
| 45 | Advertisement Protocol | Advertisement Protocol element is present if dot11InterworkingServiceActivated is true and at lease one dot11GASAdvertisementID MIB attribute exists. |
| 46 | Roaming Consortium | The Roaming Consortium element is present if dot11InterwokingServiceActivated is true and the dot11RoamingConsortiumTable has at leaset one entry. |
| 47 | Emergency Alert Identifier | One or more Emergency Alert Identifier elements are present if dot11EASActivated is true and there are one or more EAS message(s) active in the network. |
| 48 | Mesh ID | The Mesh ID element is present if dot11MeshActivated is true. |
| 49 | Mesh Configuration | The Mesh Configuration element is present if dot11MeshActivated is true. |
| 50 | Mesh Awake Window | The Mesh Awake Window element is optionally present if dot11MeshActivated is true. |
| 51 | Beacon Timing | The Beacon Timing element is optionally present if both dot11MeshActivated and dot11MBCAActivated as true. |
| 52 | MCCAOP Advertisement Overview | The MCCAOP Advertisement Overview element is optionally present if both dot11MeshActivated and dot11MCCAActivated are true. |
| 53 | MCCAOP Advertisement | One or more MCCAOP Advertisement elements ate optionally present if both dot11MeshActivated and dot11MCCAActivated are true. |
| 54 | Mesh Channel Switch Parameters | The Mesh Channel Switch Parameters element is present if dot11MeshActivated is true and either Channel Switch Announcement element or Extended Channel Switch Announcement element is present. |
| Last-1 | Vendor Specific | One or more vendor-specific elements are optionally present. These elements follow all other elements, except the Requested elements. |
| Last-n | Requested elements | Elements requested by the Request element of the Probe Request frame are present if dot11MultiDomainCapabilityActivated is true. See 10.1.4.3.2. |

The probe response frame format of the embodiments of the invention is given in Table 4 below. The Capability field may be omitted from the probe response frame format, depending on the needs. Note that other stations/smartphones receiving this probe response may immediately recognize that it is for positioning because of special SSID, which starts with a prefix GPS. While the embodiments use "GPS" as an indicator for positioning, other acronyms/characters may be used to indicate that the probe request and probe response are positioning probes. There may even be multiple prefixes that indicate that the probe request and/or probe response are abbreviated to serve positioning devices efficiently. Any prefix could be used, as long as both sender and receiver know what prefix indicates positioning probe requests and probe responses.

TABLE 4

Proposed probe response frame format.

| Order | Information | Notes |
|---|---|---|
| 1 | Timestamp | |
| 2 | Beacon interval | |
| 3 | Capability | |
| 4 | SSID | GPS SSID_NAME |
| 5 | Supported Rates | 0-1 bytes |

Figure 6:
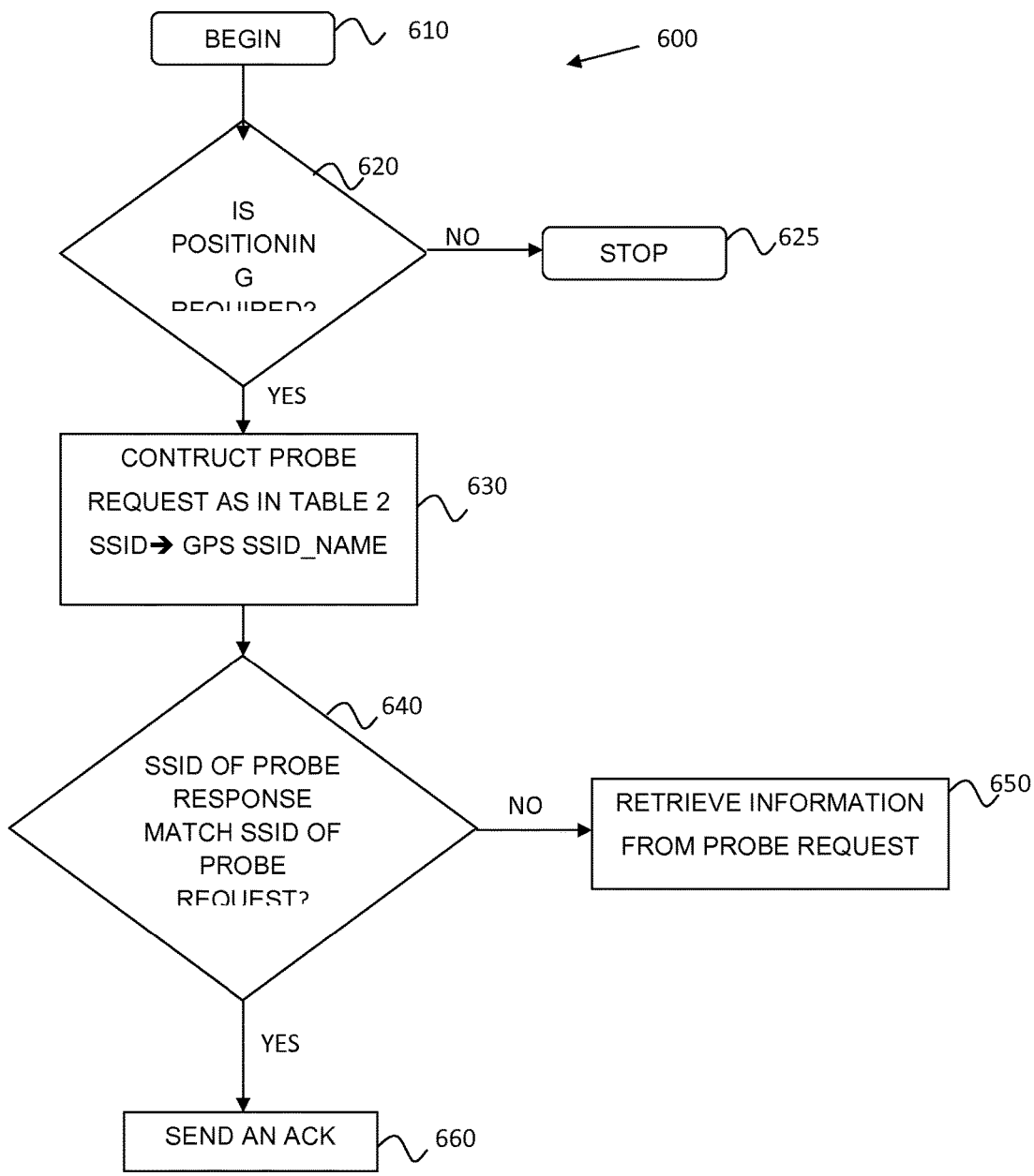
FIG. 6 shows a flow diagram for a method for positioning at a mobile wireless device or station in accordance with various embodiments.

FIG. 6 is a flowchart showing steps taken by the station/smartphone to make the exchange of these frames possible. Method 600 begins 610 with a decision if positioning is required 620. If positioning is required, the method continues to 630, where a probe request is constructed as in Table 2 (SSID➔ GPS SSID_NAME); else method stops 625. The supported rates are represented by 0-1 bytes. For example, the absence of this field would imply that rate support information is not needed and the AP will reply at the same rate at which it received the probe request frame. Coding of this one byte field can be done in different ways: different bits position can identify different IEEE 802.11 standards rates; e.g., 802.11g, 802.11n, 802.11 ac, etc. Another way will be to indicate different supported rates where each bit in the byte stands for a particular rate; e.g., bit 0 corresponds to 6 Mbps OFDM rate, bit 1 corresponds to 12 Mbps OFDM rate and so on. The reason for having supported rates is that the probe response could be sent at higher rates than the one at which probe request was sent. This is to further shorten the time over the air of the probe response. It can also allow the device to send the probe request at higher rates, knowing that AP is capable of handling these rates. It is determined if the SSID of the probe response received matches the SSID set in the probe request 640. If it matches, an ACK is sent 650; else the information from the probe request is retrieved anyway.

Figure 7:
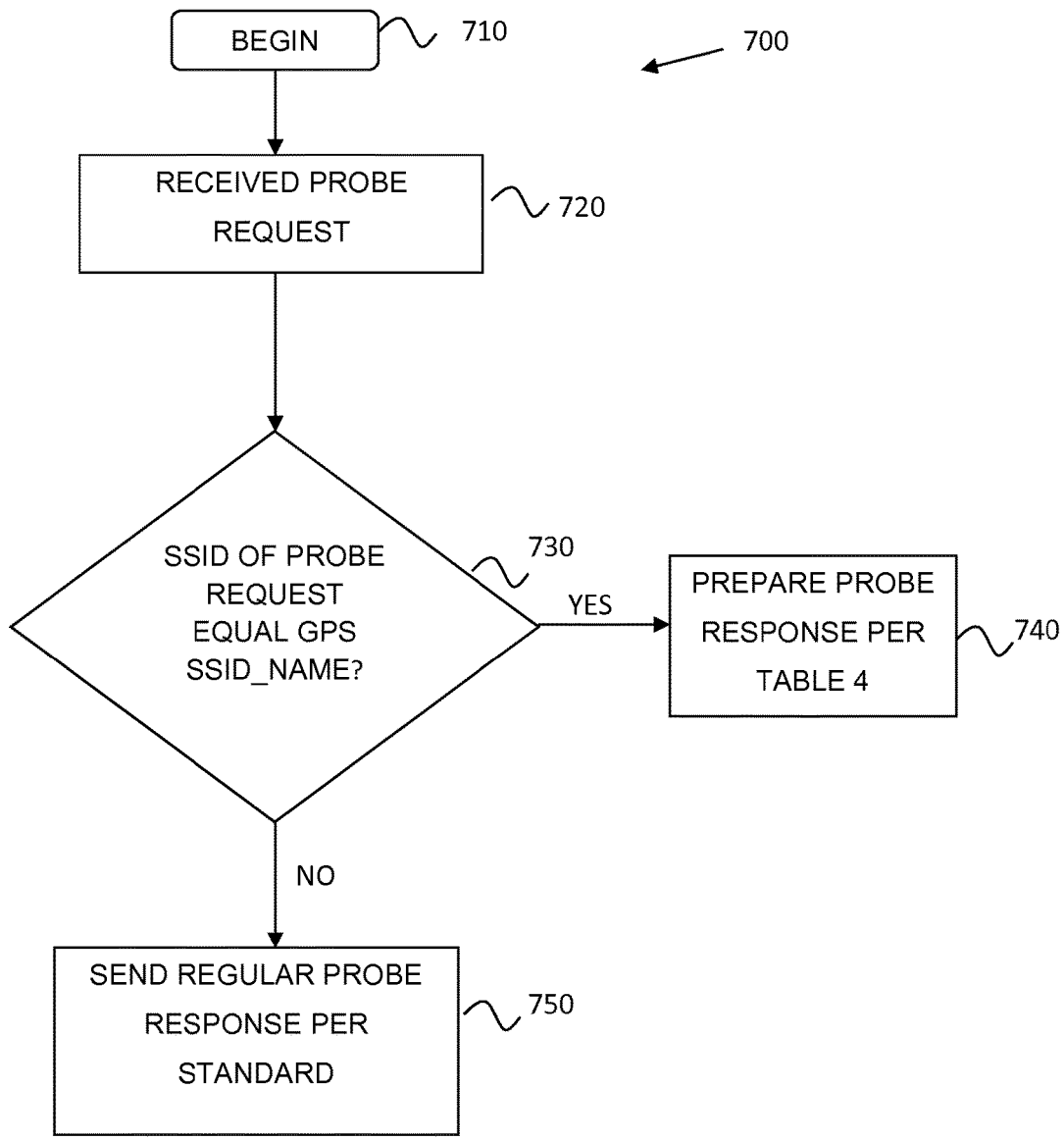
FIG. 7 shows a flow diagram for another method for handling probes in APs to determine the position of a mobile wireless device in accordance with various embodiments.

FIG. 7 is a flowchart showing steps taken by the AP to make the exchange of these frames possible. Method 700 begins 710 with the receiving of a probe request 720. It is determined if the SSID of the probe request is set to "GPS SSID_NAME" 730. If the SSID is set to GPS SSID_NAME, a probe response is prepared as shown in Table 4 (740). Otherwise, a regular probe response as defined in the standard is sent 750.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for creating probe requests in a mobile device, the method comprising:
   determining, by the mobile device, whether positioning of the mobile device is required; and
   in response to determining that positioning of the mobile device is required, transmitting, by the mobile device, a short probe request, the short probe request being shorter than a regular probe request used for handover from one access point (AP) to another, the short probe request comprising:
      a SSID_Name field including a global positioning system (GPS) prefix and a Service Set Identifier (SSID), and
      a short length supported transmission rates field, the GPS prefix indicating that the short probe request is being used for positioning purposes instead of handover purposes.

2. The method of claim 1 further comprising:
   receiving a short probe response;
   determining whether a SSID of the short probe response matches the SSID of the short probe request; and
   sending an ACK in response to determining that the SSID of the short probe response matches the SSID of the short probe request.

3. A method for creating a short probe response in an Access Point (AP), the method comprising:
   receiving, by the AP, a short probe request;
   sending, by the AP, a short probe response, in response to determining that a service set identifier (SSID) of the short probe request has a global positioning system (GPS) prefix; and
   sending, by the AP, a regular probe response, in response to determining that the SSID of the short probe request does not have the GPS prefix, the short probe response being shorter than the regular probe response.

4. The method of claim 3, wherein the short probe response contains a subset of a normal probe response, the short probe request comprising:
   a timestamp;
   a beacon interval;
   a capability; and
   a SSID set to GPS SSID_NAME.

5. The method of claim 3, wherein the short probe response comprises a subset of a normal probe response, the short probe request comprising:
   a timestamp;
   a beacon interval; and
   a SSID set to GPS SSID_NAME.

6. The method of claim 3, wherein the short probe response comprises a subset of a normal probe response, the short probe request comprising:
   a timestamp;
   a beacon interval; and
   a SSID set to GPS_SSID NAME; and
   the method further comprising sending, by the AP, the short probe response at the same rate as receiving the short probe request.

7. A mobile device comprising:
   a transceiver;
   at least one antenna coupled to the transceiver, for transmitting a signal over a wireless channel;
   a processor coupled to the transceiver;
   a non-transitory computer-readable storage medium storing a program for execution by the processor, the program including instructions for:
      in response to determining that positioning of the mobile device is required, instructing the transceiver to transmit a short probe request, the short probe request being shorter than a regular probe request used for handover from one access point (AP) to another, the short probe request comprising:
         a SSID_Name field comprising a global positioning system (GPS) prefix and a Service Set Identifier (SSID), the GPS prefix indicating that the short probe request is being used for positioning purposes; and
         a short length supported transmission rates field.

8. The mobile device of claim 7, the instructions further comprising instructions for:
   receiving a short probe response;
   determining whether a SSID of the short probe response matches the SSID of the short probe request; and
   sending an ACK in response to determining that the SSID of the short probe response matches the SSID of the short probe request.

9. An Access Point (AP) comprising:
   a transceiver;
   at least one antenna coupled to the transceiver, for transmitting a signal over a wireless channel;
   a processor coupled to the transceiver;

a non-transitory computer-readable storage medium storing a program for execution by the processor, the program including instructions for:
receiving a short probe request;
sending a short probe response, in response to determining that a service set identifier (SSID) of the short probe request has a global positioning system (GPS) prefix; and
sending a regular probe response, in response to determining that the SSID of the short probe request does not have the GPS prefix, the short probe response being shorter than the regular probe response.

10. The mobile device of claim 9, wherein the short probe response comprises a subset of a normal probe response, the short probe response comprising:
a timestamp;
a beacon interval;
a capability; and
a SSID set to GPS SSID_NAME.

11. The mobile device of claim 9, wherein the short probe response comprises a subset of a normal probe response, the short probe response comprising:
a timestamp;
a beacon interval; and
a SSID set to GPS SSID_NAME.

12. The mobile device of claim 9, wherein the short probe response comprising a subset of a normal probe response, the short probe response comprising:
a timestamp;
a beacon interval; and
a SSID set to GPS SSID_NAME; and
the instructions further comprising instructions for sending the short probe response at the same rate as receiving the short probe request.

13. A non-transitory computer-readable storage medium storing a program for execution by a processor of a mobile device, the program including instructions to:
in response to determining that positioning of the mobile device is required, transmit a short probe request, the short probe request being shorter than a regular probe request used for handover from one access point (AP) to another, the short probe request comprising:
a SSID_Name field comprising a global positioning system (GPS) prefix; and
a short length supported transmission rates field, the GPS prefix indicating that the short probe request is being used for positioning purposes instead of handover purposes.

14. The non-transitory computer readable storage medium of claim 13, the instructions further comprising instructions to:
receive a short probe response;
determine whether a Service Set Identifier (SSID) of the short probe response matches a SSID of the short probe request; and
send an ACK in response to determining that the SSID of the short probe response matches the SSID of the short probe request.

15. A non-transitory computer-readable storage medium storing a program for execution by a processor of a mobile device, the program including instructions for:
receiving a short probe request;
sending a short probe response, in response to determining that a service set identifier (SSID) of the short probe request has a global positioning system (GPS) prefix; and
sending a regular probe response, in response to determining that the SSID of the short probe request does not have the GPS prefix, the short probe response being shorter than the regular probe response.

16. The non-transitory computer readable storage medium of claim 15, wherein the short probe response comprises a subset of a normal probe response, the short probe request comprising :
a timestamp;
a beacon interval;
a capability; and
a SSID set to GPS SSID_NAME.

17. The non-transitory computer readable storage medium of claim 15, wherein the short probe response comprises a subset of a normal probe response, the short probe response comprising:
a timestamp;
a beacon interval; and
a SSID set to GPS SSID_NAME.

18. The non-transitory computer readable storage medium of claim 15, wherein the short probe response comprises a subset of a normal probe response, the short probe response comprising:
a timestamp;
a beacon interval;
a SSID set to GPS SSID_NAME; and
the instructions further comprising instructions for sending the short probe response at the same rate as receiving the short probe request.

* * * * *